United States Patent
Brandsma

Patent Number: 6,086,499
Date of Patent: Jul. 11, 2000

[54] CONTINUOUSLY VARIABLE TRANSMISSION

[75] Inventor: Arjen Brandsma, Tilburg, Netherlands

[73] Assignee: Van Doorne's Transmissie B.V., Tilburg, Netherlands

[21] Appl. No.: 09/272,578

[22] Filed: Mar. 19, 1999

[51] Int. Cl.$^7$ ........................................ F16G 5/20
[52] U.S. Cl. ................... 474/201; 474/245; 474/265
[58] Field of Search ................... 474/100, 265, 474/237, 201, 242, 245

[56] References Cited

U.S. PATENT DOCUMENTS

| | | | |
|---|---|---|---|
| 4,525,159 | 6/1985 | Filderman et al. | 474/201 |
| 4,655,732 | 4/1987 | Takashima | 474/201 |
| 4,734,085 | 3/1988 | Takashima et al. | 474/201 X |
| 5,318,484 | 6/1994 | Forster | 474/242 |
| 5,427,579 | 6/1995 | Kanehura et al. | |

FOREIGN PATENT DOCUMENTS

| | | |
|---|---|---|
| 0 777 069 | 6/1997 | European Pat. Off. . |
| 0 798 492 | 10/1997 | European Pat. Off. . |

*Primary Examiner*—Charles A Marmor
*Assistant Examiner*—Saúl Rodríguez
*Attorney, Agent, or Firm*—Young & Thompson

[57] ABSTRACT

Continuously variable transmission provided with a belt (3) and pulley (1,2) capable of interacting with each other at an acute angle ($\lambda$) under the influence of a coefficient of friction ($\mu$), and which belt is suitable for taking both pushing and pulling forces, the ratio between flank angle ($\lambda$) and the effective coefficient of friction ($\mu_{tan}$) in the tangential direction in rotating conditions being such that, measured in radians, the coefficient of friction ($\mu_{tan}$) is less than 1.1 times the value of the relevant flank angle ($\lambda$), but is greater than 0.55 times that value.

11 Claims, 3 Drawing Sheets

CONTINUOUSLY VARIABLE TRANSMISSION

FIELD OF THE INVENTION

The present invention relates to a continuously variable transmission.

BACKGROUND OF THE INVENTION

Such a transmission is generally known, for example from the European patent publication EP-A-0777069 or from SAE technical paper series 881734. In the known transmission, with the application of axial force the so-called push-belt is clamped between a pair of slightly conical sheaves of two pulleys set up at a distance from each other. The belt and a sheave rest against each other in a contact face which forms an acute angle, the flank angle or cone angle, with an orthogonal on the axis of rotation of the pulley. The clamping force of the two pulleys is such that a state of equilibrium with a fixed transmission ratio arises. The transmission proceeds to continuously variable changing of this ratio, i.e. stageless shifting while increasing the clamping force in one of the two pulleys. In the known transmission the push-belt is composed of at least one flexible band assembly, which is generally formed from metal rings and is capable of taking pulling force, and of transverse elements which at least largely freely surround the band assembly and enable the belt to transmit pushing force. The generally known transmission is usually provided with a flank angle of 11 degrees or 0.192 radians.

A wedging action between belt and pulley is associated with the acute flank angle. In order to permit shifting of the transmission during standstill, according to a generally accepted rule, the tangent of the angle of the contact face must be greater than the coefficient of friction, so that the belt can be moved in the radial direction, or tan $\lambda > \mu$. The line with points in which tan $\lambda > \mu$ is known as the self-locking limit. Close to this self-locking limit, in order to permit movement of the belt or shifting, the axial force of one of the two pulleys of a transmission must be very much greater than the axial force acting upon the other pulley. In a practical application of a transmission, in particular a vehicle transmission, the capacity of the power generator present for this purpose may be inadequate in this case. Therefore, in the design of a continuously variable transmission the self-locking limit constitutes a test parameter as regards the ratio between the flank angle and the coefficient of friction in the radial direction.

However, it has been found in practical tests that transmissions provided with a push-belt of the type described above can produce unexpected breakage of the belt, even if the flank angle meets the limit set by self-locking. The object of the present invention is to provide a transmission with a belt of the abovementioned type, in which the ratio between flank angle and coefficient of friction is such that the durability of the construction is retained, in other words, belt breakage does not occur or is very unlikely to occur in the short or even longer term.

SUMMARY OF THE INVENTION

The present invention is based on the insight and the problem that conventional measures are inadequate for designing good transmissions for the present type of belt, a belt type which, unlike belt types such as chains or stretched or unstretched rubber belts, is capable of transmitting pushing force. The invention is also based on the insight that this pushing force is part of the reason for the occurrence of the abovementioned breakage. In particular, it has been realized that under rotating conditions the abovementioned breakage can occur despite compliance with the self-locking test which is known per se. The present invention therefore sets an additional limit for rotating conditions, namely the buckling limit. In rotating conditions, according to the insight on which the invention is based, a tangential component of a friction vector related to the actual friction between belt and pulley must be distinguished. The absolute value of this vector represents the effective dynamic coefficient of friction $\mu$ in the tangential direction. The friction vector according to the insight on which the invention is based is the resultant of very slight belt slip which is always present in both the radial and the tangential direction. The slip in the tangential direction in this case is related to the force to be transmitted from one pulley to the other by way of the push-belt, while the slip in the radial direction is related to the radial movement of the belt occurring in a pulley, such as in the case of any adjustments made in the transmission ratio. Further in accordance with the insight on which the invention is based, under rotating conditions of a transmission, i.e. of the variable speed gear part thereof, the tangential component of the friction vector is of a greater order than the radial component thereof. The invention is based thereon that the amplitude of the tangential component of the abovementioned friction vector is decisive for the previously mentioned belt breakages, and thus decisive for the design of good transmissions.

Transmissions according to the present invention have therefore been designed taking into account direction and amplitude of the friction processes occurring between belt and sheave during operation, and taking into account the specific characteristic of push-belts, namely the simultaneous occurrence therein of pushing and pulling forces.

According to a further insight on which the invention is based, the abovementioned belt breakage actually occurs as a result of the pushing force becoming greater than the pulling force in a part of the belt situated between the two pulleys. Although the transverse elements by way of which the pushing force is transmitted can rest flat against each other, where larger numbers of transverse elements rest against each other instability occurs and can result in the belt buckling or bursting apart if the pulling force in the bands is inadequate. It is understood here that the pushing force to be produced in the belt is related to the effective coefficient of friction in the tangential direction, which coefficient is derived from the tangential component of the vector, and that the pulling force in the bands is related to the flank angle of the pulleys, which flank angle determines the radial component of the normal force. Where the transmission is designed with a relatively large flank angle, at a set transmitted power a relatively large band tension occurs and belt breakage may occur as a result of material fatigue. Belt breakage as a result of the latter should be prevented according to the invention by overdimensioning of the belt relative to the intended application.

According to the insight on which the invention is based, the maximum transmissible power with and the durability of a transmission with the present type of belt are thus determined by the chosen ratio between flank angle find the effective coefficient of friction in the tangential direction in rotating conditions.

In accordance with yet a further insight on which the invention is based, this ratio is dominant over further influence factors such as the coefficient of friction between the band assembly and the transverse elements of a push-belt, the centrifugal forces occurring in operation and the transmission ratio between the two pulleys of a transmission of the belt or by imposing restrictions on the power to be transmitted.

According to the insight on which the invention is based, when in the prior art reference is made to the self-locking of a variable speed gear the factor mentioned there as the "coefficient of friction" should be understood as belonging to the radial component of an effective friction vector. The absolute value of this vector in a static condition coincides with the generally known static coefficient of friction.

The abovementioned self-locking limit and the formula for it are described in SAE technical paper series 881734, in particular on page 7, at the beginning of column 2. The abovementioned self-locking limit and the formula for it are also known from European patent publication EP-A-0798492, in which in relation to this limit an explanation is given of a possible design consequence of the fact that the coefficient of friction is lower in dynamic conditions than in the static state. This publication is based on generally applicable teaching and makes no distinction on the basis of the difference between a push-belt and transmission elements such as chains which can be subjected only to a tensile load. Contrary to the insight on which the present invention is based, the publication teaches that the values for a dynamic coefficient of friction have to be applied in the formula for the self-locking limit.

From the NASA publication NTIS 82299: "Design study of steel V-belt CVT for electric vehicles", in particular page 41 thereof, it is known that a low coefficient of friction in a construction can be compensated for by increasing the clamping force of the pulleys and by reducing the cone angle. This teaching is in agreement with and follows from the abovementioned tangential relationship between cone angle and coefficient of friction. It is also known from this document (page 40) that a low dynamic coefficient of friction of 0.06 can be used in combination with cone angles of 5.5 to 6.5 degrees. However, in order to improve the efficiency of the transmission, it is preferable according to the invention to use higher coefficients of friction than that just mentioned.

In SAE technical papers series 940735, "A study of metal pushing V-belt type CVT", in particular in part 1 thereof amongst other topics, there is also a detailed discussion of the relationship between coefficient of friction and transmission ratio. However, the study does neither refer to the relationship between cone angle and coefficient of friction, nor to the buckling limit as a design parameter for continuously variable transmissions.

In preferred embodiments of the transmission according to the invention, on the one hand, the cone angle of the transmission is less than 19 radians and, on the other hand, the tangential component of the coefficient of friction is greater than 0.06. Transmissions designed within these conditions have the advantage that with the reduction of the flank angle the tensile stress in the bands is reduced while the clamping force by the sheaves remains the same. Where the material and the manufacturing process are otherwise kept the same, or at any rate where the tangential coefficient of friction is kept virtually the same, this leads to a further reduced chance of buckling, breaking of the belt as a result of high tensile load or fatigue of the belt during its service life. On the other hand, coefficient of friction greater than 0.06 prevents the clamping force necessary for preventing slip from becoming too great and thereby adversely affecting the efficiency of the transmission.

In a further preferred embodiment of the transmission according to the invention, the coefficient of friction is equal to, or lies as close as possible to, 0.7367 times the flank angle in radians, at any rate within a tolerance of 10% thereof. This preferred ratio maintains sufficient margin relative to the ratio value at which in practice breakage may occur in the belt as a result of buckling. On the other hand the tensile force in the bands is low enough to prevent fatigue, and the highest possible permissible power can be transmitted with relatively high efficiency.

BRIEF DESCRIPTION OF THE DRAWINGS

The invention will be explained in greater detail below with reference to a drawing. In the drawing.

DETAILED DESCRIPTION OF THE INVENTION

Figure 1:
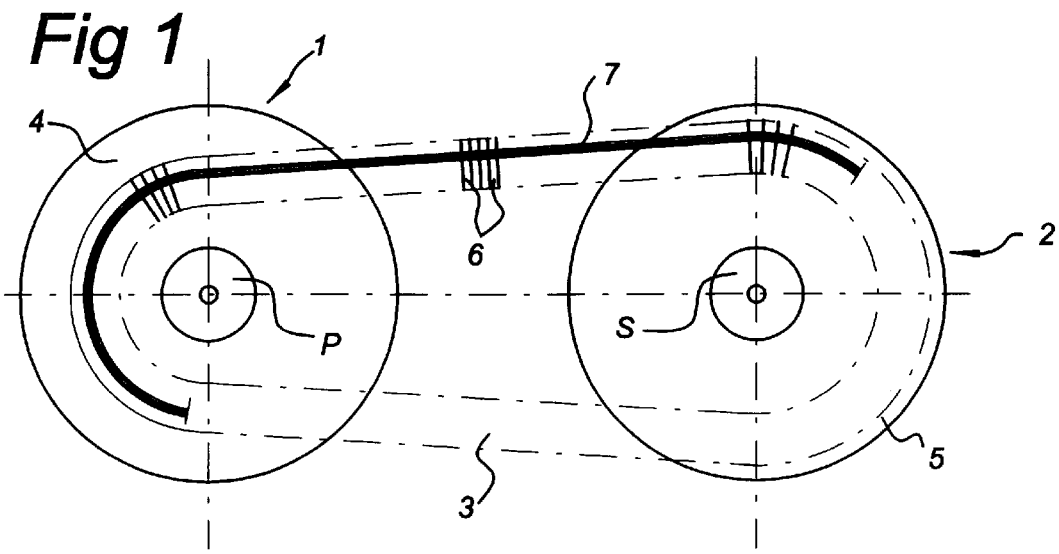
FIG. 1 is a diagrammatic illustration of a transmission known per se to which the invention relates.
Figure 2:
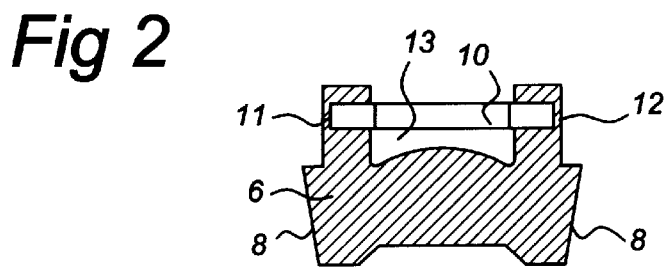
FIG. 2 is a transverse view of a possible embodiment of a transverse element for a driving belt.
Figure 3:
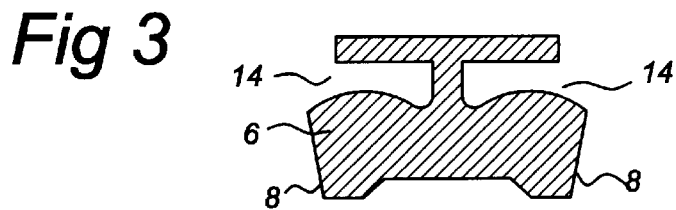
FIG. 3 is a transverse view of another embodiment of a transverse element for a driving belt.

FIG. 1 shows diagrammatically the transmission elements of a continuously variable transmission which is known per se and is suitable for use in, for example, a motor car. The transmission comprises two pulleys 1, 2, each consisting of a pair of slightly conical belt sheaves with a driving belt or belt 3 fitted between them. The pairs of sheaves 1, 2 are fitted around a primary shaft P and a secondary shaft S respectively. The driving belt 3 is provided with a support 7, on which the transverse elements 6 are fitted in such a way that they are movable. One embodiment of such a transverse element is shown in FIG. 2. The transverse element 6 concerned is provided with a recess 13 for accommodating a support 7, which can consist of, for example, a bundle of flat metal rings. The top side of the abovementioned recess 13 can be closed by means of a closing pin 10, which can be placed in the bores 11 and 12 of the transverse element 6. Another embodiment of a transverse element is shown in FIG. 3. In this case the transverse element 6 concerned contains a pair of recesses 14, in which a support 7 can be accommodated. The support 7 is generally formed by a bundle of endless elements such as flat, flexible metal bands placed around each other. In both embodiments the transverse elements 6 are provided with converging side faces 8, which can engage with the respective conical contact surfaces 4 and 5 of the belt sheaves 1 and 2. The engagement defines an imaginary contact face 17 which in the known transmission is imaginable at an angle λ of 11 degrees or 0.192 radians with an orthogonal line on the axis of rotation concerned. The last-defined angle is described as a flank angle or cone angle. As a result of transmission oil present in the transmission, an oil film can be formed here between the contact surfaces 4 and 5 at one side and the side faces 8 at the other side, as a result of which the driving belt 3 can slip relative to the belt sheaves 1 and 2. The efficiency of the transmission will be reduced as a result of this and excessive wear can occur. In order to prevent this, the side faces 8 and/or the contact faces 4, 5 have a rough structure. The combination of roughness of the surfaces of sheave and links and the choice of the type of transmission oil produce an effective coefficient of friction between pulley and belt in the rotating state.

Figure 4A:
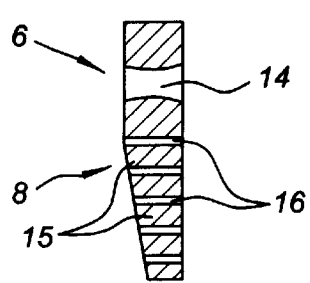
FIGS. 4a and 4b are a longitudinal view of the transverse element of FIG. 3 with straight and slanting grooves respectively according to the prior art.
Figure 4B:
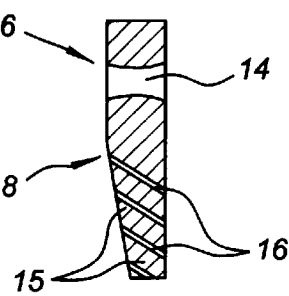

FIGS. 4a and 4b show the transverse elements 6 with side faces 8 provided with a mutually differing profiled surface, for example in the form of grooves 15 between protuberances in the form of ridges 16 which can likewise run parallel or slanting relative to the support 7.

Figure 5:
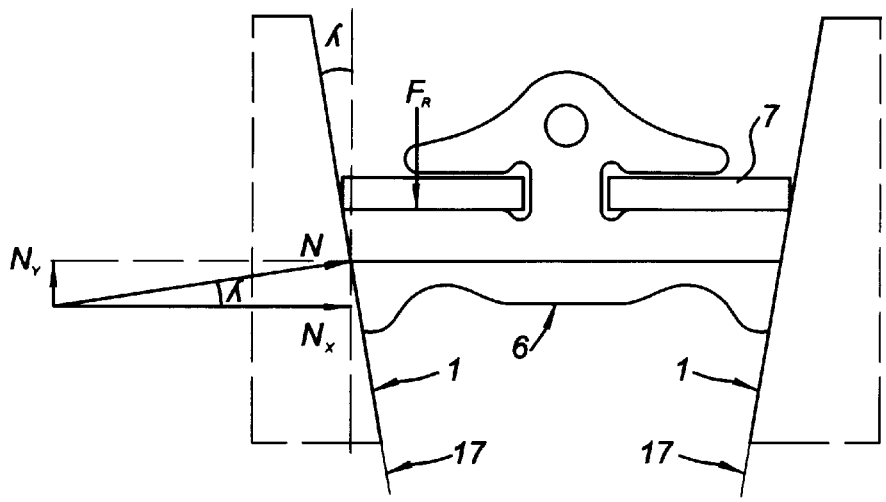
FIG. 5 is a diagrammatic representation of an axial and radial cross-section of the part of the pulley where a link is wedged between two sheaves.

FIG. 5 shows diagrammatically the forces acting upon a belt-pulley combination. The normal force N in practice is exerted by way of hydraulic pressure applied in a pressure chamber which is variable in size and one wall of which is movable, and is formed by a sheave of the pulley. The pressure chamber is fed by means of a hydraulic pump. The pressure applied results in the reaction force N which, depending on the contact angle λ, can be separated into an axially directed force Nx and the radially outward directed force Ny. The sum of the normal forces acting together on all elements making contact with a pulley, combined with the tangential component of the effective coefficient of friction $\mu$ during operation, is decisive for the pushing force transmissible by the belt. Here attention must be paid to the pulley where the product $\mu$ and the sum of the normal forces on all gripped elements is smallest. This maximum possible value for the pushing force between the elements can manifest itself, inter alia, at the point between the elements where the support is in the stretched state. The radial force Ny is counteracted by the belt by way of a counterforce of the support 7 developed in the arc made, which counterforce expresses itself in a radially inward directed band load corresponding to a force Fr per element, as indicated in FIG. 5. If now in one of the stretched parts of the belt the pushing force locally becomes greater than the pulling force locally, this expresses itself by breakage of the belt in accordance with the insight on which the invention is based. The intactness of the belt during use has therefore become. inter alia, a function of flank angle λ, combined with coefficient of friction $\mu$, the condition always being that the axial force must be so high that slipping in the tangential direction of the belt relative to the pulley is prevented, in other words, is virtually absent.

According to the invention, in rotating conditions radial shifting of the belt relative to the pulley, and therefore slipping in the radial direction, also occurs, but this is always very slight relative to the tangential direction. By way of example, a very low belt speed of 2 meters per second with virtually no slip, for example of a maximum of 1% in the tangential direction, produces a slip of 0.01 meter per second. A very rapid shifting motion of the belt in a maximum of 4 seconds over a maximum stroke of 50 mm produces a slip of 12½ millimeters per second, =0.00125 meter per second, in the radial direction. This means that the slip in the radial direction in rotating conditions is of the order of magnitude oft at least approximately a factor 10—and in practice is generally a factor of 100—lower than the slip in the tangential direction. Nevertheless, both slip movements form components of the slip actually occurring, the size and direction of which deviates from the above-mentioned components. This actual slip is accompanied by effective friction and thereby an actual coefficient of friction. Its size and its direction relative to the pulley mean that this coefficient can be given as a vector. Where the tangential or radial coefficient of friction $\mu_{tan}$ or $\mu_{rad}$ are mentioned below, this will therefore indicate the coefficient of friction belonging to the tangential or radial component of the friction vector conceivable in the case of the friction actually occurring.

Figure 6:
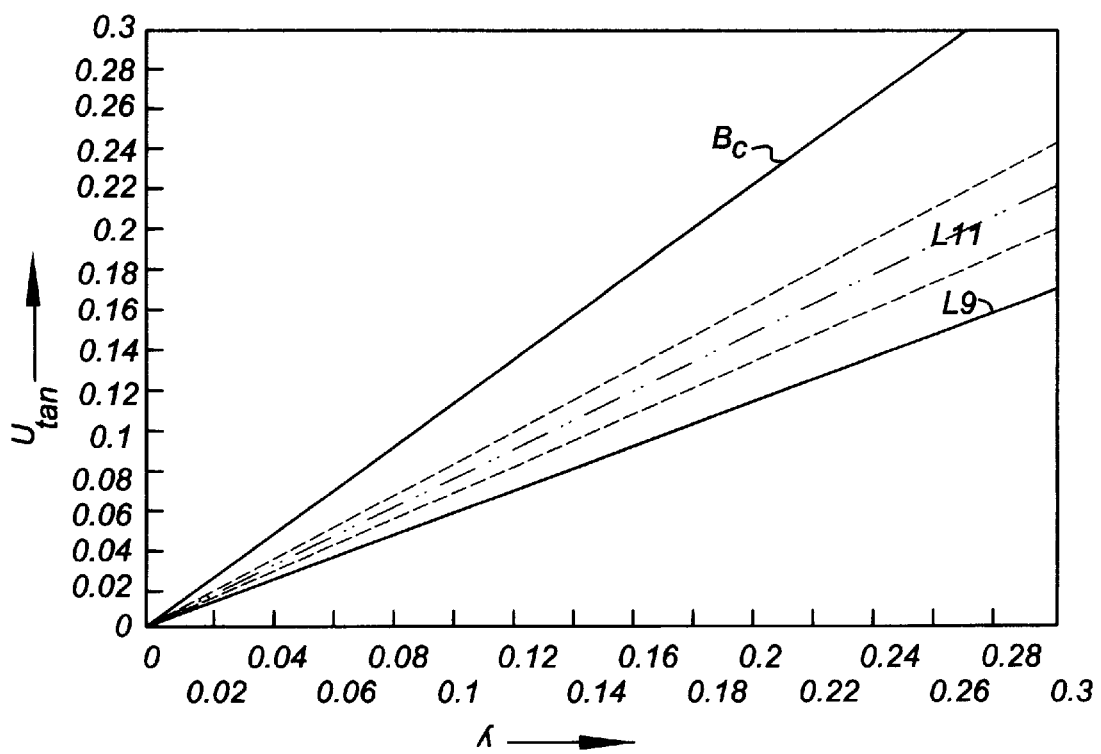
FIG. 6 is a representation of ratios between flank angle, shown along the x-axis, and coefficient of friction between a belt and a pulley, shown along the y-axis, which ratios according to the invention are important for good design of a transmission.

FIG. 6 gives for various flank angles λ and coefficients of friction $\mu_{tan}$ the ratio which a transmission according to the invention has to meet. The flank angles λ are shown along the x-axis in radians, while the effective coefficient of friction $\mu_{tan}$ in rotating conditions is shown along the y-axis. In accordance with the insight on which the invention is based, it is preferable to call this coefficient shown along the y-axis the "torque transmission coefficient". The top line $B_c$, along which the ratio of $\mu_{tan}/\lambda$ is 1.1, according to the invention forms the buckling limit to be applied for practical purposes and shows the ratios above which there is a real chance of the belt buckling and therefore breaking. Such a break is probably initiated by disturbances such as transverse vibrations. On the basis of theoretical considerations, it might be expected that the theoretical buckling limit in which the pushing force and pulling force in the belt are equal is formed by an asymptote along the y-axis. The difference between such a theoretical buckling limit and the current practical buckling limit $B_c$ should presumably be explained by the minuscule differences in force which can destroy such a state of equilibrium. The buckling limit $B_c$ determined according to the invention in this respect is found to coincide with a margin of approximately 3%. In FIG. 6 the line L11 shows the ratios by which according to a preferred embodiment of the invention transmissions with a safe margin relative to $B_c$ are obtained. The preferred ratio L11 with $\mu_{tan}/\lambda=0.7367$ distances itself so much from the buckling limit $B_c$ that permanent intactness of the belt 3 both at the time of putting into service and during the actual service life of the belt cain be expected. On the other hand, sufficient distance is retained relative to the ratio along the line L9 below which the permissible power to be transmitted is less than the optimum, in other words, lower than achievable. Along the line L9 the ratio $\mu_{tan}/\lambda$ is 0.55, coinciding with a safety margin of approximately 17%.

The effective coefficient of friction $\mu_{tan}$ in the tangential direction in the case of transmissions according to the invention can be established by means of the formula:

$$\mu_{tan} = \frac{T \cdot \cos\lambda}{N_x \cdot 2 \cdot R}$$

in which T is equal to the maximum transmissible torque on the primary, i.e. input, shaft when there is an axial force $N_x$ set on the secondary pair of sheaves, and in which R forms the radius of the arc made by the belt on the primary pair of sheaves, i.e. the radius at which the transverse elements make contact with each other. The axial force can be calculated from the hydraulic pressure exerted on the pulley sheaves and the dimension of the pressure face on a pulley sheave. Part of the axial force can be applied in practice by a spring. This force can be calculated. The pressure exerted is supplied in a transmission by a pump incorporated for the purpose, and can be determined by means of a manometer suitable for the purpose. Part of the exerted pressure is caused by the centrifugal force of the oil. This force can be calculated. The maximum transmissible torque in the present example is measured by means of a torque measuring shaft. The measurement can be made either in a car or on a test bench. In each case where the design of the transmission is such that only a slight distance to the buckling limit $B_c$ is maintained, according to the insight on which the invention is based, the measurement should be carried out at the most accelerating ratio or in overdrive. The movable primary sheave here is situated in the outermost position at which the radius R is the maximum. The measurement in this case is carried out at a speed of rotation of 3000 revolutions per minute on the primary shaft. If necessary, the measurement should be carried out at a speed of rotation which comes closest to this speed of rotation. The oil temperature should be approximately 70°, while the pulley and the belt and the oil should be in a new state for each measurement. The use of the abovementioned measurement produces in a simple way a determination of the effective coefficient of friction in the tangential direction.

Figure 7:
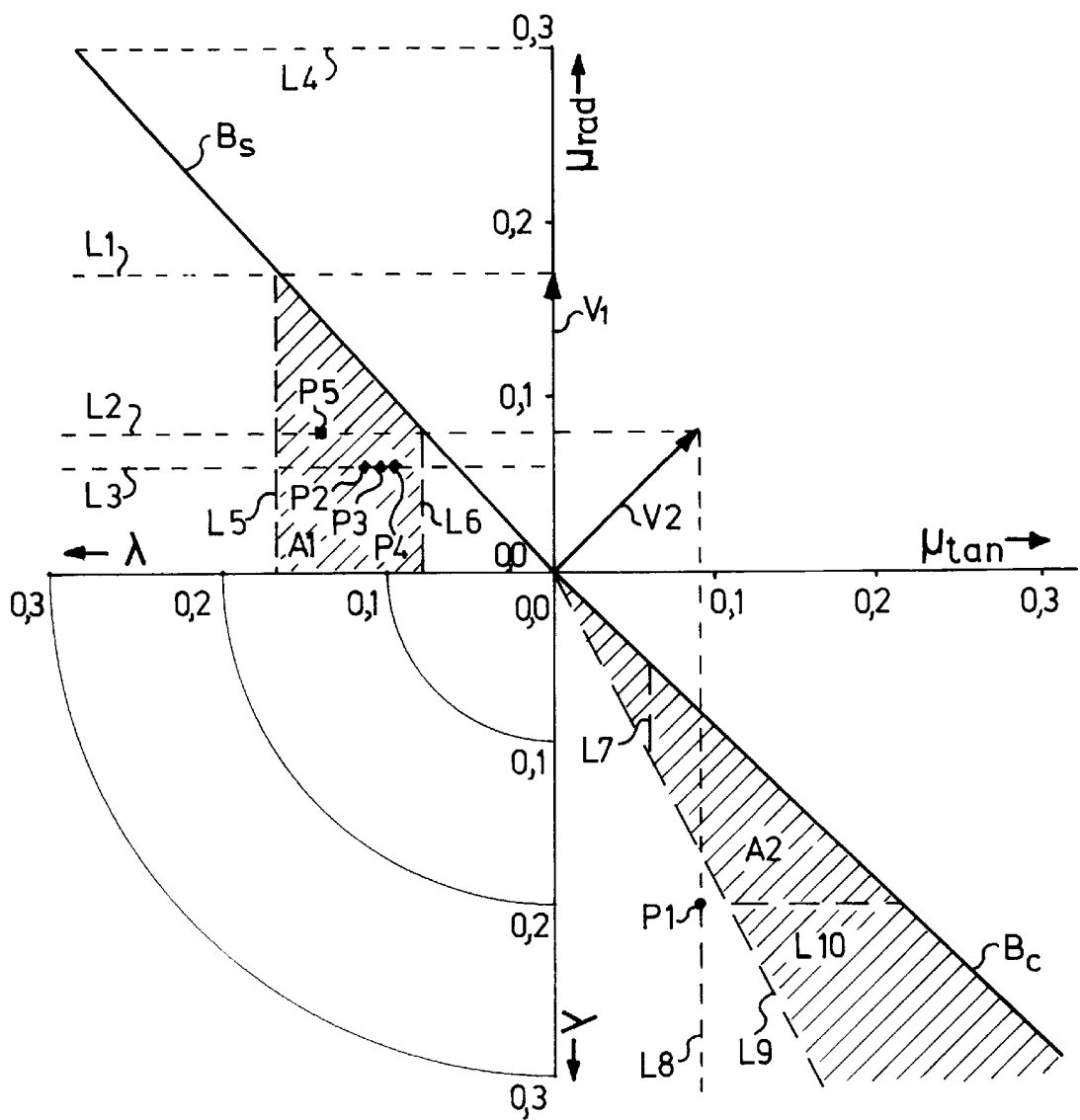
FIG. 7 is a diagram in which the distinction required according to the invention between a radial and tangential component of an effective coefficient of friction is shown, together with a comparison of the range of ratios identified according to the invention with the ratios known from the prior art.

FIG. 7 is a so-called three-quadrant diagram, in which in the first quadrant along the x-axis the effective coefficient of friction $\mu_{tan}$ in the tangential direction is plotted against the radial component $\mu_{rad}$ of the coefficient of friction along the y-axis. The second quadrant shows in accordance with FIG. 6 a plotting of the ratio according to the invention with the cone angle in radians along the y-axis and the effective coefficient of friction $\mu_{tan}$ in the tangential direction along the x-axis. The fourth quadrant is a representation of the ratios known from the prior art between cone angle, shown along the x-axis in radians, and the effective coefficient of friction $\mu_{rad}$ in the radial direction along the y-axis. The third quadrant shows curved connecting lines which indicate that the y-axis of the second quadrant and the x-axis of the fourth quadrant are the same. Along both axes the cone angle $\lambda$ is plotted in radians. In FIG. 7 references as follows are used:

L1=$\mu_{static}$=0.17; known from EP-A-0798492.
L2=$\mu_{dynamic}$=0.08; known from EP-A-0798492.
L3=$\mu_{dynamic}$=0.06; known from NASA publication NTIS 82299.
L4=$\mu_{static}$=0.3; known from NASA publication NTIS 82299.
L5=$\lambda$=9.65° (±0.16 rad); known from EP-A-0798492.
L6=$\lambda$=4.57° (±0.08 rad); known from EP-A-0798492.
L7=$\mu$=0.06; limit conditions for $\mu_{tan}$ in preferred embodiments according to the invention.
L8=$\mu$ dynamic=0.09; known through the push belt of Van Doorne's Transmissie b.v. available on the market.
L9=$\mu_{tan}/\lambda$=0.55; the lowest limit value of the range with suitable ratios of $\mu_{tan}$ and $\lambda$ for good efficient transmission designs according to the invention.
L10=0.19 rad; the highest limit value for $\lambda$ in preferred embodiments according to the invention.
$B_c$=the buckling limit for maximum permissible ratios between $\mu_{tan}$ and $\lambda$ according to the invention.
$B_s$=the self-locking limit at which tan $\lambda$=$\mu_{stat}$
A1=the Area of possible combinations of $\mu$ and $\lambda$ as known from EP-A-798492, determined by $B_s$, L6, the x-axis and L5.
A2=the Area of possible combinations of between $\mu_{tan}$ and $\lambda$ accordingto preferred embodiments of transmissions according to the invention, determined by $B_c$, L10, L9 and L7and situated within the range of ratios for transmissions according to the invention.
P1=the point with $\lambda$=11° (±0.192 rad) and $\mu$=0.09 known through transmissions equipped with the push-belt of Van Doorne's Transmissie b.v.

P2=the point with $\lambda$=6.5° (±0.113 rad) and $\mu$=0.06 known from NASA publication NTIS 82299.
P3=ditto P2 with $\lambda$=6.0° (±0.105 rad).
P4=ditto P2 with $\lambda$=5.5° (±0.096 rad).
P5=optimum combination according to EP-A-0798492 with $\lambda$=8° (±0.140 rad) and $\mu$=0.08.
V1=a vector which in accordance with the insight on which the invention is based represents an effective coefficient of friction in static conditions.
V2=a hypothetically determinable vector for an actual coefficient of friction prevailing in rotating conditions between a pulley and a belt.

The vector V2 is hypothetical because no measured values are known for the radial component $\mu_{rad}$ of the vector of the coefficient of friction in dynamic conditions. The measurement prescribed according to the invention produces only the effective component $\mu_{tan}$ in the tangential direction. Therefore, a real vector for the effective coefficient of friction in dynamic conditions cannot be determined. A so-called dynamic coefficient of friction is in fact known from the patent publication EP-A-0798492, but it is not differentiated according to a radial and tangential component. Moreover, this dynamic coefficient of friction in this publication is used in the formula for the self-locking limit, which in accordance with the insight on which the present invention is based, at least in the case of push belts does not automatically lead to an optimum but safe belt design. FIG. 7 also makes it figuratively clear that the ideas commonly held until now as regards a coefficient of friction to be distinguished as static or as dynamic are not comparable with the effective coefficient of friction $\mu_{tan}$ in the tangential direction according to the invention or the coefficient of friction belonging to the tangential component of the actual friction in a friction vector representing a rotating belt-pulley combination.

The known value of the coefficient of friction $\mu_{tan}$ indicated in P1 in FIG. 7 is shown in the fourth quadrant because it was determined by Van Doorne's Transmissie b.v., besides, without any notion according to the insight on which the invention is based, according to measuring method therefor prescribed according to the invention, and therefor contains only the absolute term of the tangential component of the friction vector. The point P1 also illustrates that the measuring method described can be used for maintaining the limit $B_c$ distinguished according to the invention and the tangentially effective coefficient of friction $\mu_{tan}$ to be measured in the process. The illustration of FIG. 7, in particular the region A2 therein, also illustrates the real possibilities for improvement of the design of applicant's push belt available on the market for successful use in commercially available vehicles.

The invention is not limited to what is described above, but also relates to all details shown in the figures and/or in the claims which follow.

What is claimed is:

1. Continuously variable transmission provided with a belt (3) and pulley (1, 2) capable of interacting with each other at an acute flank angle ($\lambda$) under the influence of a coefficient of friction ($\mu$), and which belt (3) is suitable for taking both pushing and pulling forces, characterized in that the ratio between flank angle ($\lambda$) and the effective coefficient of friction ($\mu_{tan}$) in the tangential direction in rotating conditions is such that, measured in radians, the coefficient of friction ($\mu_{tan}$) is less than 1.1 times the value of the flank angle ($\lambda$), but is greater than 0.55 times that value.

2. Continuously variable transmission according to claim 1, characterized in that the effective coefficient of friction ($\mu_{tan}$) in the tangential direction is substantially equal to 0.7367 times the flank angle ($\lambda$) in radians, or at least within a tolerance of 10% thereof.

3. Continuously variable transmission according to claim 2, characterized in that the flank angle ($\lambda$) is less than 0.19 radians, and the coefficient of friction ($\mu_{tan}$) is greater than 0.06.

4. Continuously variable transmission according to claim 2, characterized in that the effective coefficient of friction ($\mu_{tan}$) in the tangential direction is determined in the most accelerating state of the transmission.

5. Continuously variable transmission according to claim 2, characterized in that the effective coefficient of friction ($\mu_{tan}$) in the tangential direction is measurable at an input speed of rotation of 3000 revolutions per minute.

6. Continuously variable transmission according to claim 1 characterized in that the flank angle ($\lambda$) is less than 0.19 radians, and the coefficient of friction ($\mu_{tan}$) is greater than 0.06.

7. Continuously variable transmission according to claim 6, characterized in that the effective coefficient of friction ($\mu_{tan}$) in the tangential direction is determined in the most accelerating state of the transmission.

8. Continuously variable transmission according to claim 6, characterized in that the effective coefficient of friction ($\mu_{tan}$) in the tangential direction is measurable at an input speed of rotation of 3000 revolutions per minute.

9. Continuously variable transmission according to claim 1, characterized in that the effective coefficient of friction ($\mu_{tan}$) in the tangential direction is determined in the most accelerating state of the transmission.

10. Continuously variable transmission according to claim 9, characterized in that the effective coefficient of friction ($\mu_{tan}$) in the tangential direction is measurable at an input speed of rotation of 3000 revolutions per minute.

11. Continuously variable transmission according to claim 1, characterized in that the effective coefficient of friction ($\mu_{tan}$) in the tangential direction is measurable at an input speed of rotation of 3000 revolutions per minute.

* * * * *